United States Patent
Schulz et al.

[11] Patent Number: 5,955,794
[45] Date of Patent: Sep. 21, 1999

[54] METHOD AND ARRANGEMENT FOR CONTROLLING THE OUTPUT OF A LOAD CONNECTED TO AN AC LINE VOLTAGE

[75] Inventors: Detlef Schulz, Altenriet; Gerhard Kurz, Industriestrasse, D-72382 Althengstett, both of Germany

[73] Assignee: Gerhard Kurz, Althengstett, Germany

[21] Appl. No.: 08/892,043

[22] Filed: Jul. 14, 1997

[30] Foreign Application Priority Data

Feb. 14, 1997 [DE] Germany ............... 197 05 907
Feb. 14, 1997 [DE] Germany ............ 297 02 524 U

[51] Int. Cl.⁶ ........................................ H02J 3/01
[52] U.S. Cl. ................. 307/127; 323/212; 327/452; 388/917; 363/96
[58] Field of Search ................ 307/127, 31, 38, 307/39; 323/212, 205; 702/64; 327/438, 469, 476, 452; 363/96, 27; 388/917

[56] References Cited

U.S. PATENT DOCUMENTS

| | | | |
|---|---|---|---|
| 3,863,134 | 1/1975 | Pollard | 363/96 |
| 4,078,168 | 3/1978 | Kelly | 219/497 |
| 4,554,623 | 11/1985 | Ainsworth | 363/96 |
| 4,811,236 | 3/1989 | Brennen et al. | 323/212 |
| 4,891,570 | 1/1990 | Nakamura et al. | 323/212 |

FOREIGN PATENT DOCUMENTS

| | | |
|---|---|---|
| 372 556 | 10/1983 | Austria . |
| 27 02 142 | 8/1978 | Germany . |
| 33 03 126 | 8/1984 | Germany . |
| 43 27 070 | 4/1995 | Germany . |
| 195 36 148 | 4/1997 | Germany . |
| 1 449 600 | 9/1976 | United Kingdom . |

*Primary Examiner*—Albert W. Paladini
*Attorney, Agent, or Firm*—Cohen, Pontani, Lieberman & Pavane

[57] ABSTRACT

A method and arrangement for controlling the output of electrical consumers connected to ac line voltage, especially of electric motors and the like, in which the output is changed by changing the phase control of the electric alternating magnitude supplied to the consumer. The extent of the firing angle determining the extent of the phase control is varied toward larger or smaller values around the given reference value of the firing angle, which reference value corresponds to the desired power consumption, so that asymmetry of the firing angle is produced with respect to time between two successive full waves, whereby odd-numbered harmonics are sharply reduced as even-numbered harmonics slowly increase.

11 Claims, 1 Drawing Sheet

METHOD AND ARRANGEMENT FOR CONTROLLING THE OUTPUT OF A LOAD CONNECTED TO AN AC LINE VOLTAGE

BACKGROUND OF THE INVENTION

1. Field of the Invention

The invention relates to a method for controlling the output of a load connected to ac line voltage. The invention further relates to an arrangement for controlling the output of the load pursuant to the inventive method.

2. Description of the Prior Art

Devices for controlling the output of loads which are connected to ac voltage, generally the line voltage, are known in a variety of forms. Such devices usually comprise a phase control circuit by which the blocking period or the firing angle can be adjusted in a desired manner at the a.c. line voltage supplied to the consumer, so that the supplied power can be regulated.

Phase control circuits of this kind are known, for example, from German reference DE 33 03 126 C2, which is directed to a device for switch-on peak limiting in a motor control unit for the driving motor of a vacuum cleaner. The motor control unit is provided with a phase control circuit. German reference DE 43 27 070 C1 describes a device for regulating the power consumption of a vacuum cleaner in which the ac voltage supplied to the electric motor driving the vacuum cleaner is regulated via a phase control circuit such that the supply voltage value corresponds to the effective value of the motor voltage. The phase control circuits used for this purpose generally contain a triac which is connected to line voltage in series with the load, in this case an electric motor, and supplies the electric motor with a discontinuous (sine) voltage depending upon the power desired.

Based on a circuit built from discrete components for the phase control, although the range of conceivable possibilities for realizing the circuit extends from optionally large-scale integration to pure microprocessor control, the phase control in the trigger circuit for the triac comprises a resistor which is generally adjustable as a potentiometer or trimmer and a charging capacitor for firing the triac depending on the adjusted resistance, so that practically any desired intermediate outputs up to the full angle can be called up as desired by appropriate shifting of the firing angle.

However, a recent problem in this regard in phase control circuits of this kind is that with increasingly higher possible maximum power output of the electrical load, a limit is predetermined with respect to the harmonics generated overall by the load, including its control circuit. This limit can not be overcome by simple means. For the sake of clarity, the output of a vacuum cleaner motor will be taken as an example hereinafter, although it is understood that the invention is applicable to any electrical load.

In general, harmonics always occur in the absence of proportionality between the current and voltage, wherein, in the output control of an electric universal motor, harmonics are chiefly formed at first as odd-numbered harmonics which are derived in a first approximation from the quadratic dependency between current and voltage. Additional harmonics are formed through the phase control itself. These harmonics are especially pronounced when the firing angle is approximately 90°, that is, when the permeability to current of the series triac is effected to some extent in the middle of the respective half-wave as a result of corresponding firing.

The above-mentioned limit of permissible harmonic content is determined by governmental regulations and is represented in Europe by the EMV (EMC or electromagnetic compatibility) standard, as it is called, and to this extent also represents a power limit for the permissible motor output which, expressed in numerical values, is roughly 1200 to 1400 W based in general on conventional electric motors with the known phase controls.

The problems resulting from this limit can be circumvented or combatted only at a high cost. The measurements are conventionally carried out at a phase angle of 90° and with reference to 16 successive full waves, during which time the harmonic content may not exceed a predetermined value.

Therefore, it is also known to avoid this problem by way of hardware, namely by way of the electric motor, by using a motor with two field windings. One of the windings is available for power delivery up to a maximum 1400 W, for example, which can be operated via a phase control with a harmonic content just within the permissible range. At an increased demand for power, the other field winding is switched to by suitable switching means (microswitch) while the phase control is completely switched off, so that full power, e.g., 1800 W, can be achieved with the second field winding in continuous full-wave operation, that is, without phase control. Naturally, the harmonic content attributable to the phase control is dispensed with in its entirety.

Such measures which are elaborate with respect to construction require considerable additional material at correspondingly high costs, not the least of which is made up by assembly costs, and necessitate omission of the phase control precisely when it would be especially desirable under certain circumstances in the very high power output range for sensitive adjustment.

SUMMARY OF THE INVENTION

Accordingly, it is an object of the present invention to provide a solution for the aforementioned problems and to provide a method and an arrangement for controlling the power of electrical loads connected to ac line voltage in order to achieve a drastic reduction in the harmonic content with only slight circuit modifications of the conventional phase control circuit controlling the voltage supply of the load, so that it is possible to reliably control higher outputs, e.g., up to 1800 W, to give a numerical value, within the given harmonic limiting value.

The invention is based on the surprising recognition that even-numbered harmonics only increase slowly, but odd-numbered harmonics can be sharply reduced by deliberately producing an asymmetry in the firing angle between full waves succeeding one another in time, but not necessarily directly following one another.

Pursuant to this object, and others which will become apparent hereafter, one aspect of the present invention resides in an output control method in which the firing angle is varied around the given firing angle reference value, preferably in successive full waves, although this is not absolutely necessary, but has proven advantageous.

This variation or introduction of asymmetry, which means, in other words, applied to the specific embodiment described below, that a power switch (triac) is preferably fired irregularly in a controlled manner, results in the advantage that occurring harmonics partially cancel themselves out again. It is therefore possible, up to maximum power, to remain within the given limiting value, e.g., the EMC standard, while nevertheless retaining the phase control, although it should be noted that the component of the harmonics which derives from the load, in the below described embodiment a universal motor, itself is not, and in principle can never be, influenced by this, since this component derives from the constructional type of an electric motor as such (iron content).

Therefore, it is possible and especially advantageous that a considerable additional increase in power is made possible within the harmonic content prescribed by the EMC standard basically by means of only a few additional steps which lie within the area of the phase control circuit and can therefore be realized in a comparatively economical manner, also, e.g., for conventional electric driving motors for household use, without requiring considerable changes in total consumption, so that the invention achieves a decisive advantage through the economical use of resources.

Another aspect of the invention resides in an arrangement for controlling output of an electrical load connected to an ac line voltage. The arrangement includes output control means for changing a phase control angle of electrical magnitude supplied to the load, and a control circuit operatively connected to the load to vary an actual firing angle around a reference value of a firing angle of the desired power consumption. The control circuit includes a triac connected in series with the consumer. Different firing angle signals are supplied to the triac at each immediately successive full wave of line voltage to be connected to the load. The control circuit further includes a firing angle control device operatively associated with the triac so that during full waves of the a.c. line voltage supply to the load the firing angle control device supplies actual firing angle signals to the triac which are either advanced or retarded with respect to time compared with the reference value of the firing angle at a given power output. The actual firing angle signals are advanced or retarded by equal angular amounts of deviation from the reference value.

In another embodiment, an additional parallel resistor is arranged in a trigger circuit for the triac, so that its potentiometric resistance undergoes a (periodic) change. This additional resistor is controlled with reference to the rhythm of the successive full waves so that a firing angle which is shifted ahead by a predetermined firing angle value, that is, in the direction of greater power output, is given in a first full wave and a firing angle value which is retarded in time, that is, shifted in the direction of lower power output, is given in a subsequent full wave, depending on whether the parallel resistor is switched on or off in this full-wave cycle.

However, let it be repeated at this point that this only relates to a particularly advantageous realization of a phase control circuit and the possibility addressed herein of varying the firing angle can be achieved by a multitude of other steps in large-scale integration, partially hybrid and discrete circuit techniques.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
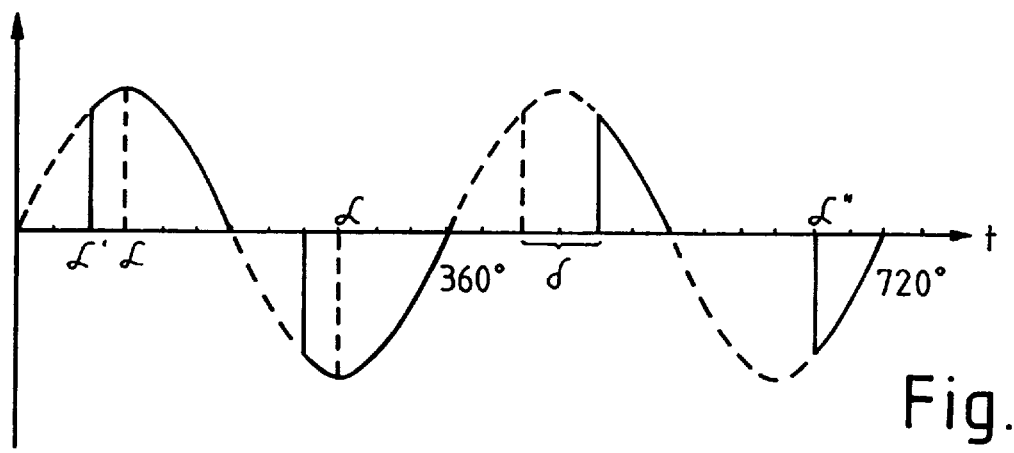
FIG. 1 shows the time curve of a load ac supply voltage, wherein it can be detected in discontinuous operation by means of the phase control circuit that, as shown in solid lines, that the actual firing angle of the control means in one full wave comes too soon and in the subsequent full wave comes too late compared with the reference value of the firing angle $\alpha$.

The basically sinusoidal course of an ac supply voltage coming from a phase circuit of a control device to an electrical load (illustrated in FIG. 3) is illustrated in the graph in FIG. 1. The actual firing angle $\alpha'$ of the control device connected to the load, in the first full wave (see the thick solid line), is smaller compared with the firing angle $\alpha''$ of the control device in the subsequent second full wave, resulting in a differential angle $\delta$.

In other words, at the smaller value of $\alpha'$ in the first full wave the output is rather large and actually too large, while in the second full wave with the firing angle $\alpha''$ which is too large, output is small, that is, too small, with reference in both instances to the actual power requirement given by the reference firing angle $\alpha$, which is 90° in the present embodiment for the sake of simplicity and which can, itself, naturally be readjusted, e.g., by external intervention as required for the desired power output of the load.

Therefore, in this embodiment, the first firing angle $\alpha'$ of the control device is 60° and the second firing angle $\alpha''$ is 120°. The differential angle $\delta$ is accordingly 60°.

This variation or asymmetry of the firing angle of the control device in successive full waves (not necessarily full waves immediately following one another) of the ac voltage magnitude supplying supplied to the load is based on the recognition, which was already mentioned above, that when such asymmetry of the firing angle is generated with respect to time between two successive waves, rather than between positive and negative half-waves of a full wave, the even-numbered harmonics increase slowly and the odd-numbered harmonics are sharply reduced. This precisely suits the output control in an electric motor which already tends of its own accord to generate odd-numbered harmonics which, naturally, can not be influenced by circuits, as was already mentioned above. Overall, however, the total harmonic content is reduced to the extent that the limiting value conditions of the aforementioned regulations are met as a result of the successive asymmetries of the firing angle distribution diverging from the reference value of the firing angle $\alpha$.

Figure 2:
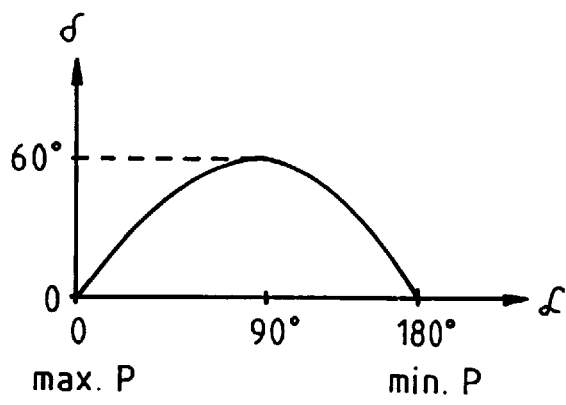
FIG. 2 shows the curve of the differential angle $\delta$ over the reference value of the firing angle $\alpha$.

Naturally, there is no divergence from the desired output reference value of the load, since the actual firing angles $\alpha'$, $\alpha''$ vary around the reference value of the firing angle, namely, sometimes toward one side and sometimes toward the other side. That is, so to speak, they work with pre-firing and with post-firing, wherein the firing angle offset, that is, the differential angle $\delta$, is preferably 60°, for example, as is shown in the graph in FIG. 2, e.g., at an assumed reference value of the firing angle $\alpha$ of a maximum of 90°. As the maximum power is approached, i.e., the smaller the reference value of the firing angle $\alpha$ itself and, in the extreme case, at a firing angle $\alpha$ of 0° when there is no longer any phase control at all, the differential angle $\delta$ is naturally also equal to zero. In this case, however, the firing angle variation will also no longer be required, since substantially no harmonics are generated any longer as a result of the phase control circuit. The same is true of power output 0, that is, the maximum reference value of the firing angle α. Also, in this case, that is, when a triac of a phase control circuit, which triac is in series with the load, no longer opens at all, the differential angle δ is likewise equal to zero (see the curve shape in FIG. 2 and the triac in FIG. 3).

Clearly, the principle found by the invention can be understood thus: in the full wave with a large firing angle (corresponding to low output), the third harmonic is small and shifted in phase toward the zero crossing. In the full wave with a small firing angle (corresponding to high output), the third harmonic, while powerful, is phase-shifted in the opposite direction, so that the two third harmonics resulting from the two full waves with different firing angles of α' and α" can cancel themselves out in part. Similar considerations can apply for the other harmonics, although they are less significant or insignificant in comparison to the third harmonic.

Measurement Example

Figure 3:
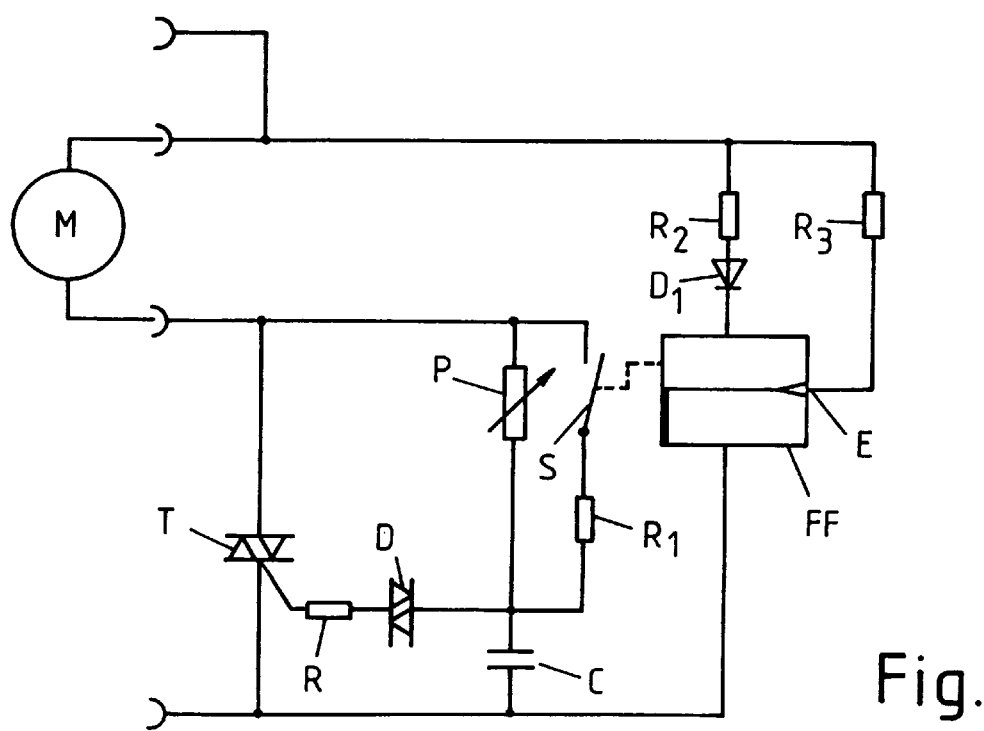
FIG. 3 shows a schematic embodiment of a phase control circuit in discrete components for reducing the harmonic component in electrical consumers, pursuant to the present invention.

In a test construction, constructed as in FIG. 3, for example, with a motor having an output of 1200 W, an original overall third harmonic of 2.3 A results at a reference-value firing angle α a of 90°. This third harmonic is reduced from the aforementioned 2.3 A to 1.5 A as a result of a firing angle offset of 45° toward the front and toward the rear, i.e., for example, from a value α' of 45° and a value α" of 135°, wherein the motor itself caused a third harmonic of 1.3 A under full load. At the same time, the fourth harmonic increased from approximately 50 mA to 300 mA, that is, it remained rather insignificant itself in this range.

These measurements confirm a truly drastic decrease in the overall harmonic content exclusively through the firing angle variation which is ensured by the invention and can be realized in a simple manner as is described hereinafter.

Circuit Design with Firing Angle Asymmetry

As shown in FIG. 3, a phase control circuit includes the load M, such as an electric motor, and the series triac T which can be switched to conduct in both half-waves the to motor M.

In addition to the conventional capacitor C, a corresponding series potentiometer P is found in the trigger circuit of the motor. The triac gate is triggered from the connection point of the capacitor C and the series potentiometer P via a diac D and a series resistor R.

Another resistor R1 is connected in parallel with the resistance of the potentiometer P and is in series with a switch S which, in the closed state, allows the parallel resistor R1 to become active at the resistance value of the potentiometer P and, in the open state, switches it off.

In this case, the switch S, which can be any electronic, preferably transistorized, fast switch, is triggered by a flip-flop FF which is periodically switched at its input E via a resistor R3 with half of the line frequency. The flip-flop FF is fed via the series connection of a resistor R2 with a diode D1.

As is known, the triac T is fired at a normal phase control independently of polarity and time at a determined angle, wherein the firing angle can be changed by adjusting the potentiometer P. By means of the additional periodic change of this resistance of the potentiometer P with half of the line frequency (that is, 25 Hz in the embodiment based on a German or European line frequency of 50 Hz), the parallel resistance R1 in one full wave with closed switch S is parallel to the power-setting potentiometer P and is switched off in the next full wave when the switch S is opened. This leads to a corresponding periodic change of the resistance value of the potentiometer P and to a corresponding shifting of the firing angle α in time toward the front or rear to values α' or α" as is shown in FIG. 1, so that the desired aim is achieved. In so doing, the flip-flop FF is triggered in the positive zero crossing by half of the line frequency.

It should be pointed out once more that the invention is not limited by this embodiment of a phase control circuit which was discussed with reference to the combination of discrete components, nor is the inventive scope given thereby. Rather, the invention can be realized by any circuit design steps and also in large-scale integrated form, for example, by means of a fast microprocessor. It is also possible, depending upon the intended application, to control a greater number of full waves with a given first value of a firing angle α' and to move on to the second firing angle which is offset in the opposite direction relative to the reference value of the firing angle only after several full waves. Empirical tests are well suited for determining whether and in what way the controlled consumer is influenced by this, e.g., by a change in the noise generated thereby, flickering in light banks, and the like. Also, it goes without saying that no limiting of existing line frequencies or of the line frequencies provided by power supply facilities is required. If necessary, other frequencies or frequency doubling, etc. can be used, insofar as this seems meaningful, also, a control range for time constant control for firing the triac. Additionally, any technically useful time distribution pattern, also of a stochastic nature, where appropriate, can be used in this case.

The invention is not limited by the embodiments described above which are presented as examples only but can be modified in various ways within the scope of protection defined by the appended patent claims.

We claim:

1. A method for controlling output of a load connected to an a.c. line voltage, comprising the steps of: providing phase control of the ac voltage supplied to the load with a phase control circuit; determining a given reference value of a firing angle of the phase control corresponding to a desired power consumption of the load; and varying, the firing angle of successive full waves of the ac supply voltage towards one of larger and smaller values around said given reference value of the firing angle so as to create an asymmetry of the firing angle of respective successive full waves that sharply reduces odd-numbered harmonics and slowly increases even-numbered harmonics.

2. A method according to claim 1, wherein the step of varying the firing angle includes varying the firing angle so that in a first full wave an actual firing angle is smaller in both half-waves compared to the reference value of the firing angle and that in a later following full wave the actual firing angle is greater in both half-waves compared to the reference value firing angle, whereas third harmonics generated by the phase control circuit itself are at least partly eliminated.

3. A method according to claim 1, wherein an actual firing angle for a first full wave and a firing angle for a following full wave differ equally and opposedly from the reference value firing angle.

4. A method according to claim 3, wherein the actual firing angle of the first full wave and the firing angle of the following full wave differ from the reference value firing angle in an equal magnitude.

5. An arrangement for controlling output of a load connected to an a.c. line voltage, comprising: output control means for the a.c. voltage supplied to the load, the output control means including a phase control circuit having a predetermined reference firing angle corresponding to a desired power consumption of the load; and a control circuit operatively connected to the phase control circuit to vary the firing angle for successive full waves around the predetermined reference value of the firing angle towards respective larger and smaller values to thereby decrease overall harmonic content of the a.c. line voltage due to activity of the output control means.

6. An arrangement according to claim 5, wherein the phase control circuit includes a triac in series with the load, the control circuit being operative to supply different firing angle signals to the triac for immediately successive full waves of the a.c. line voltage.

7. An arrangement according to claim 6, wherein the phase control circuit further includes a firing angle control device operatively connected with the triac so that during full waves of the voltage supplied to the load the firing angle control device supplies actual firing angle signals to the triac which are one of advanced and retarded with respect to time, compared with the reference firing angle.

8. An arrangement according to claim 7, wherein the firing angle control device is operative to supply the actual firing angle signals advanced or retarded by equal angular amounts of deviation from the reference firing angle.

9. An arrangement according to claim 7, wherein the control circuit includes a potentiometer and a capacitor operatively connected to the triac, and further comprising a trigger circuit, operative to switch at half of the line frequency, operatively associated with the potentiometer in the control circuit, and a first resistance, the trigger circuit including a switch operative to connect the first resistance in parallel with the potentiometer in one full wave and switch off the first resistance in one of a next full wave and one of following full waves.

10. An arrangement according to claim 9, wherein the trigger circuit includes a flip-flop.

11. An arrangement according to claim 9, and further comprising a diac and a second resistance connected in series between the first resistance and a base of the triac.

* * * * *